(12) United States Patent
Hayden et al.

(10) Patent No.: US 10,451,030 B2
(45) Date of Patent: Oct. 22, 2019

(54) WIND TURBINE BLADE AND A METHOD OF ASSEMBLING A WIND TURBINE BLADE AND A SPAR CAP CONNECTION PIECE

(71) Applicant: Blade Dynamics Limited, Southampton, Hampshire (GB)

(72) Inventors: Paul Trevor Hayden, Southampton (GB); Andrea Giuseppe Avaldi, Milan (IT)

(73) Assignee: BLADE DYNAMICS LIMITED, Southampton, Hampshire (GB)

( * ) Notice: Subject to any disclaimer, the term of this patent is extended or adjusted under 35 U.S.C. 154(b) by 495 days.

(21) Appl. No.: 15/166,340

(22) Filed: May 27, 2016

(65) Prior Publication Data

US 2017/0342959 A1 Nov. 30, 2017

(51) Int. Cl.
*F03D 1/06* (2006.01)
*B29C 70/00* (2006.01)
(Continued)

(52) U.S. Cl.
CPC ............ *F03D 1/0675* (2013.01); *B29C 70/00* (2013.01); *B29C 65/505* (2013.01);
(Continued)

(58) Field of Classification Search
CPC ... F03D 1/0675; B29C 70/00; B29C 65/5014; B29C 65/505; B29C 65/5078;
(Continued)

(56) References Cited

U.S. PATENT DOCUMENTS 3,885,071 A * 5/1975 Blad .................... B29C 37/0082
428/60
5,281,454 A * 1/1994 Hanson ............... B29C 66/1122
138/155
(Continued)

FOREIGN PATENT DOCUMENTS

CN 1977108 6/2007
CN 102734058 10/2012
(Continued)

OTHER PUBLICATIONS

Great Britain Search Report issued in connection with corresponding WO patent application GB1509135.8 dated Nov. 2, 2015.
(Continued)

*Primary Examiner* — Igor Kershteyn
(74) *Attorney, Agent, or Firm* — Dority & Manning, P.A.

(57) ABSTRACT

A wind turbine blade comprising first and second adjacent blade sections arranged end to end along the length of the blade. Each section comprises an aerodynamic fairing and a spar. Each spar comprises a shear web extending across the fairing and a pair of spar caps, one at either end of the shear web. Each spar cap in the first section has a different cross-sectional shape and/or material from the respective spar cap in the second section and wherein the spar cap in the first section is joined to the respective spar cap in the second section via a connection piece. Each connection piece is a pre-cured component extending along the length of the blade from a first inclined end configured to connect to a first complimentary inclined end of a spar cap of the first blade section and a second inclined end.

20 Claims, 5 Drawing Sheets

(51) Int. Cl.
*B29C 65/50* (2006.01)
*B29C 65/00* (2006.01)
*B29L 31/08* (2006.01)

(52) U.S. Cl.
CPC ...... *B29C 65/5014* (2013.01); *B29C 65/5078* (2013.01); *B29C 66/1142* (2013.01); *B29C 66/5241* (2013.01); *B29C 66/7212* (2013.01); *B29C 66/72141* (2013.01); *B29L 2031/085* (2013.01); *F05B 2230/60* (2013.01); *F05B 2240/302* (2013.01); *F05B 2250/71* (2013.01); *F05B 2280/6003* (2013.01); *Y02E 10/721* (2013.01); *Y02P 70/523* (2015.11)

(58) Field of Classification Search
CPC ........... B29C 66/1142; B29C 66/72141; B29C 66/5241; B29L 2031/085; B29K 2307/04; B29K 2309/08; F05B 2230/60; F05B 2250/71; F05B 2280/6003; Y02E 10/721; Y02P 70/523
See application file for complete search history.

(56) References Cited

U.S. PATENT DOCUMENTS

| | | | | |
|---|---|---|---|---|
| 6,743,504 | B1* | 6/2004 | Allen | B29C 70/446 |
| | | | | 428/362 |
| 7,364,407 | B2* | 4/2008 | Grabau | F03D 1/065 |
| | | | | 416/229 R |
| 8,172,539 | B2* | 5/2012 | Kootstra | F03D 1/0658 |
| | | | | 416/223 R |
| 9,394,881 | B2* | 7/2016 | Obrecht | B21D 53/78 |
| 9,518,558 | B2* | 12/2016 | Baker | F03D 1/0675 |
| 2006/0083907 | A1 | 4/2006 | Bech et al. | |
| 2006/0127222 | A1 | 6/2006 | Arelt | |
| 2008/0069699 | A1 | 3/2008 | Bech | |
| 2009/0162208 | A1 | 6/2009 | Zirin | |
| 2010/0116938 | A1 | 5/2010 | Kline et al. | |
| 2010/0310379 | A1 | 12/2010 | Livingston | |
| 2011/0243736 | A1 | 10/2011 | Bell | |
| 2012/0213642 | A1 | 8/2012 | Wang | |
| 2013/0129518 | A1 | 5/2013 | Hayden et al. | |
| 2014/0271217 | A1 | 9/2014 | Baker | |
| 2014/0301855 | A1 | 10/2014 | Busbey et al. | |
| 2016/0341177 | A1* | 11/2016 | Bech | F03D 1/065 |

FOREIGN PATENT DOCUMENTS

| | | |
|---|---|---|
| WO | 2009034291 A2 | 3/2009 |
| WO | 2013010979 A2 | 1/2013 |
| WO | WO 2014/096002 A1 | 6/2014 |
| WO | 2015003713 A1 | 1/2015 |

OTHER PUBLICATIONS

Great Britain Search Report issued in connection with corresponding GB Application No. 1509135.8 dated Jun. 23, 2016.
European Search Report and Opinion issued in connection with corresponding European Application No. 16171158.5 dated Oct. 11, 2016.
Chinese Office Action, dated Feb. 27, 2019.

* cited by examiner

WIND TURBINE BLADE AND A METHOD OF ASSEMBLING A WIND TURBINE BLADE AND A SPAR CAP CONNECTION PIECE

BACKGROUND

Embodiments of the present invention relates to a wind turbine blade, a method of assembling a wind turbine blade and a spar cap connection piece.

In particular, it relates to a wind turbine blade comprising at least two sections which are joined together and to the manner in which they are connected.

Given the need for ever longer wind turbine blades, it is now well known to produce wind turbine blades in a number of sections which can be transported to a location close to the location of the wind turbine to which they are to be attached. The blades can then be assembled at such a location to avoid the need to transport a full length blade. The use of the smaller sections has further advantage as smaller components can be made in a more controlled process. Further, the ability to join different sections together means that more blade designs can be produced at a lower cost. For example, it becomes easier to extend a blade to improve performance.

There is a significant difference between the facilities available at such as site as compared to those which are available in the factory environment. There is therefore a need to provide joints which are straightforward to assemble in situ.

The applicant has appreciated that there is merit in the idea of using high performance materials and high quality production techniques in order to produce certain parts of the blade. For example, it is beneficial to produce a high quality tip section in order to reduce parasitic mass as any additional mass in the tip section generates significant loads along the remainder of the blade.

However, such materials create a problem with the manner in which these are attached to other components which are made of different materials and using different manufacturing techniques which may not be compatible with the high performance materials.

Further, the applicant is considering the possibility of producing high quality tip sections which can be fitted to blade sections made by third parties. Under the circumstances, any problems of incompatibility between sections are likely to be exacerbated.

These incompatibilities are potentially problematic as the spar caps are primarily responsible for providing the bending stiffness and strength of the blade. These highly loaded components must satisfy the bending strength and stiffness requirements to maintain the structural integrity of the blade even across transitions between potential incompatible segments.

BRIEF DESCRIPTION

By using a connection piece which can effectively provide a transition from one spar cap configuration to another, embodiments of the present invention overcome the above problems. In some cases, the spar caps may be tapered in the vicinity of the joint. In these cases, the tapered portion should be ignored when considering whether the spar caps have different cross-sectional shapes as required by an embodiment. Put another way, the reference to a different cross-sectional shape is a reference to the shape in addition to any tapered portions of the spar caps. The overriding consideration is that, at either end, the connection piece matches the shape of the spar cap, such that, if the spar caps have different cross-sections the size and shape of the connection piece is adapted accordingly. The connection piece can be a relatively small component which can be readily and precisely moulded in a factory environment to have the required characteristics. The piece can, if necessary, be shipped to a separate party who is responsible for making the first section. In this case, one end of the connection piece will be made to the third party specification and they can incorporate this into the spar cap of the first section as this is created. The manufacturer of the second section, for example a high quality tip component, then has significant control over the surface to which the second portion will be attached such that this can readily be done in situ.

The requirement that the material varies along the length of the connection piece may be met in a number of ways. The material may change in its chemical composition. Alternatively, in the case of a composite, the physical make-up may change. For example, the shape and/or size of the fibres in the matrix may change from one end to the other, as may the relative concentration of fibre to matrix material. Another possibility is that as well as, or as an alternative to the above, the microstructure may be different. Thus, even if the composite constituent of the fibre and matrix are the same, and the same fibres are used throughout, the manufacturing method may mean that the microstructure of the as-processed material may be different from one end to the other.

The connection piece can be connected in a factory environment such that, when the sections are assembled, in situ, there are two high quality and well defined surfaces with which to make the join.

Even if no third party is involved, the connection piece can be useful in allowing the connection of two spars that are of otherwise incompatible material, for example when a high quality tip portion is attached to a lower quality main body portion.

The connection piece may be made with both inclined ends having the same length. However, one inclined end may be longer than the other. If the connection piece is being supplied for fitting by a third party, the supplying party will not have as much knowledge or control of the finish of the third party spar cap. By providing a relatively long inclined end for attachment to the spar, less accuracy is required at this end of the connection piece. This is because the third party has a larger bonding surface. Also, if the connection piece is made of fibrous layers of uniaxial fibre extending along the length of the blade, having a relatively long inclined end face means that each layer of the fibres terminates at a location which is reasonably well spaced from an adjacent layer, thereby distributing any stress concentrations over a much wider area.

The connection piece may be joined directly to the spar cap of the adjacent blade section. However, in an embodiment, there is a double scarf component between the connection piece and the spar cap of the adjacent section. The double scarf component takes the form of a component having a wide V-shape cross-section. This is connected to an inclined end of the connection piece and an inclined end face of the adjacent spar cap which is oriented in the opposite sense from the inclined end face of the connection piece. Such a double scarf component has the advantages described in WO 2012/004571 that it provides a high bonding area and can be brought into position without disturbing the adhesive if it is a pre-cured component. Alternatively, it can readily be built up in situ from a stack of laminates.

The spar caps of one section may simply have a different width or depth as compared to the respective spar caps of the adjacent section. However, more probably, the spar caps of one section have a curved profile in cross-section to conform to the aerodynamic surface and the spar caps of the adjacent section have a flat profile in cross-section for the purposes of the field joint design.

Embodiments of the present invention also extend to a method of assembling a wind turbine blade according to the first aspect of the present invention, the method comprising attaching a connection piece to each of the spar caps of the first section; and subsequently attaching the connection pieces to a respective spar cap of the second section.

The connection pieces may be directly attached to the respective spar caps of the second section. However, more particularly, the connection pieces and respective shear webs in the second section present outwardly facing inclined surfaces inclined in opposite directions and a double scarf component is attached to these surfaces to complete the joint.

An embodiment of the present invention also extends to a spar cap connection piece comprising a pre-cured composite component comprising uniaxial fibre running along the length of the component from a first end to a second end in a longitudinal direction corresponding, in use, to the longitudinal direction of the spar to which it is fixed, the first and second ends being inclined in the same sense to the longitudinal direction each at a respective acute angle; the connection piece having a transition region in which the cross-sectional shape and/or the material of the connection piece transitions from one form to another along the transition region so that, in use, it is able to connect two spar caps having a different cross-sectional shape and/or material.

Each inclined end of the connection piece may be angled at the same acute angle such that the two ends are parallel to one another. However, more particularly, each inclined end is angled at a different acute angle. This allows one of the end faces to present a larger bonding surface as described above.

If the connection piece is required to have a shape which transitions from one form to another along the transition region, this may be a simple change of width or depth. However, more particularly, the connection piece transitions from a curved profile in cross-section at one end to a flat profile in cross-section at the opposite end.

BRIEF DESCRIPTION OF THE DRAWINGS

An example of a wind turbine blade spar cap connection piece will now be described with reference to the accompanying drawings, in which.

DETAILED DESCRIPTION

Figure 1:
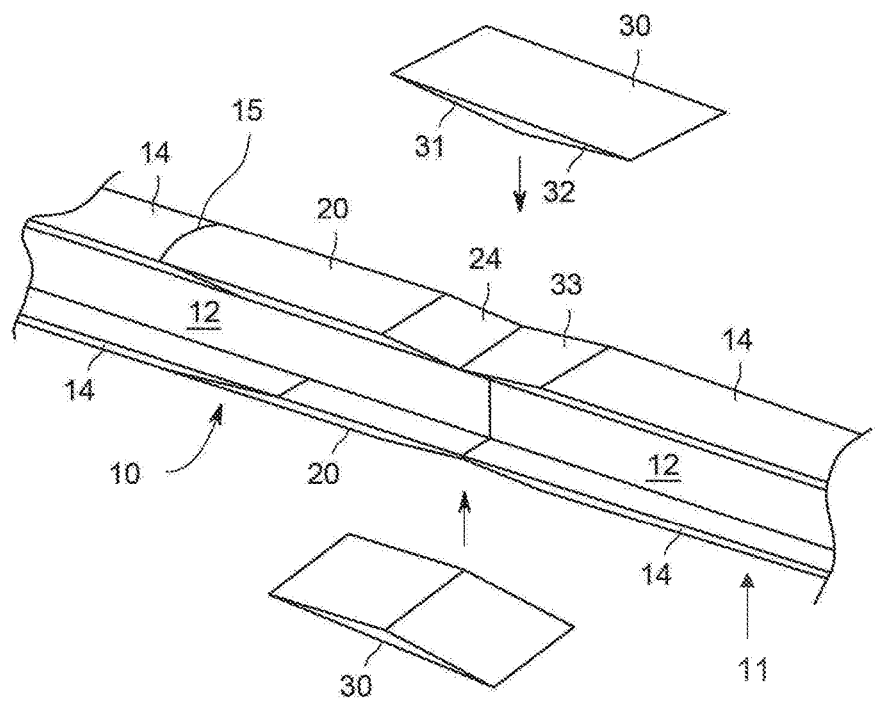
FIG. 1 is a perspective view of a partially assembled spar between two spar sections.

The wind turbine blade is made up of a number of sections connected end to end. The basic structure of the blade is, for example, as disclosed in WO 2012/004571 and WO 2009/034291. The present invention provides a new method of providing a connection between the spar caps of adjacent sections and the description below will focus on this.

The first section has a first spar section 10 extending along the length of the section to provide the structural integrity of the blade and, in particular, to resist the high bending loads which occur on the blade. The second section has a similar spar section 11. Each spar section has a shear web 12. This runs transversely across the blade section and generally comprises a composite material of multi-axial fibres.

Each spar section is completed by a spar cap 14 running along the top and bottom edges of the shear web. The spar caps 14 are a composite material generally comprising a uniaxial fibre which runs along the length of the blade.

In this particular example, the first section may be a lower quality component which forms a central or inner portion of the blade while the second portion may be a high quality tip section. The tip section may use higher quality pre-preg material, while the first section is more cost-effective vacuum assisted resin transfer moulding. The dissimilarity in the manufacturing methods makes the design of the joint between the spar sections more difficult because of the difference in the quality and properties of the spar caps. The processing temperatures of the resins may be incompatible for such a joint. For example, the transfer moulding resin requires a temperature below 80° C. while the pre-preg resin requires temperatures greater than 100° C.

Another possibility is that the second section may be a tip with carbon fibre spar caps which are joined to a glass fibre in the spar of the first section in order to extend the blade length while maintaining the same blade mass. The difference in the spar cap materials between the stiffness, strength and thickness of the piles used in the laminate creates difficulty in matching the properties in the spar caps in the joint region. It is also possible that one of the spar sections (for example, in this case, the first spar section 12) may have a curved cross-section as depicted by line 15 in FIG. 1 while the second section may have spar caps with a flat spar cap profile.

A spar cap connection piece 20 is provided to address these issues. As shown in FIG. 1, there is one such spar cap connection piece 20 for each of the spar caps in the first spar section 12.

Figure 2:
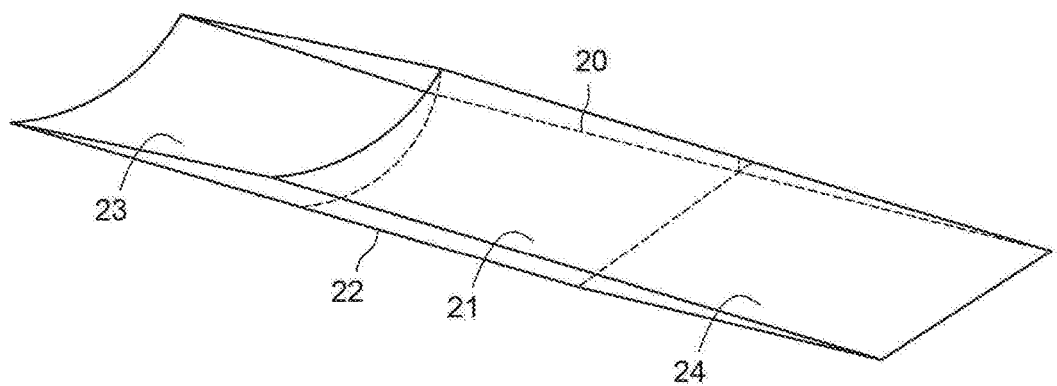
FIG. 2 is a perspective view of a spar cap connection piece from the lower spar cap in FIG. 1.

FIG. 2 shows in greater detail the lower spar cap connection piece 20 from FIG. 1. As can be seen, this is designed to fit generally within the same envelope as the surrounding spar caps, although, in the case of incompatible adjacent spar cap shapes, the connection piece is designed to transition from one shape to the other. The connection piece has an upper 21 and lower 22 surface which, in use, form continuations of the upper and lower surfaces respectively of the spar caps. It also has a first inclined end 23 for connection to the spar cap of the first section and a second inclined end 24 for connection (directly or indirectly) to the second spar section 11.

As best shown in FIG. 2, the first inclined end 23 has a curved shape in order to match the curved shape 15 of the spar caps 14 of the first spar section 10. The shape of the spar cap connection piece 20 then transitions to a flat shape at the second end surface 24 as shown in FIG. 2.

The first spar section 10 may be a component manufactured by a third party. In which case, they can be supplied with the spar cap connection piece 20 prior to the creation of the first spar section 10. When creating the first spar section 10, the connection piece 20 can be laid up in the moulds, whereupon the material of the spar cap is laid up over the connection piece. This provides minimal disruption to the creation of the first spar section 10, but what emerges is a spar segment with an end face 24 which is both precisely defined and is well known to the manufacture of the second spar section 11.

Figure 3:
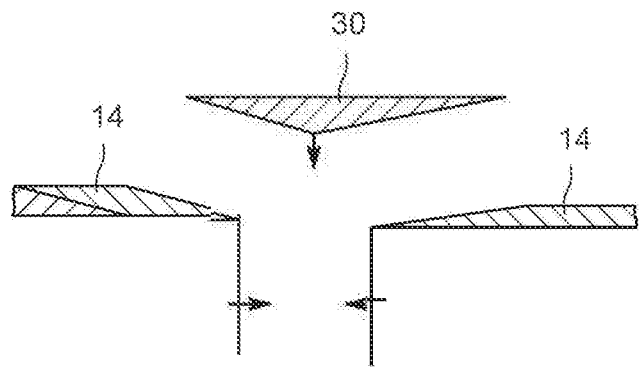
FIG. 3 is a cross-sectional view through the top portion of the spar prior to assembly.
Figure 4:
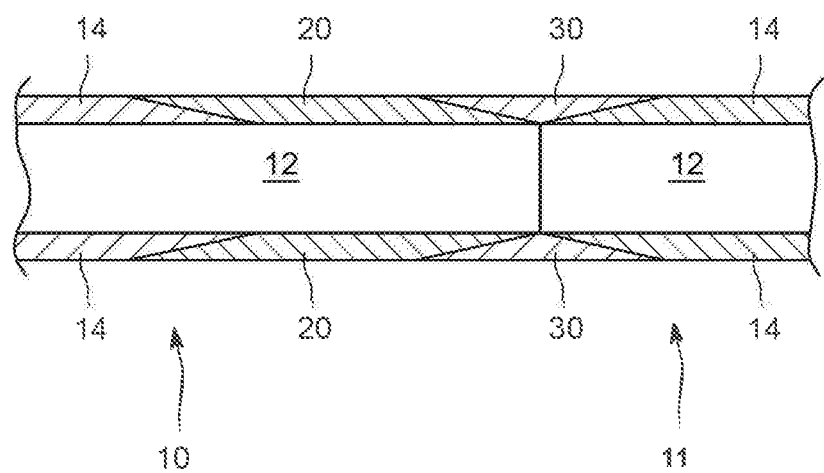
FIG. 4 is a cross-sectional view through the spar shown in FIG. 1 following completion of the connection process.

The spar cap connection piece 20 shown in FIG. 2 has end faces 23 and 24 which are inclined in the same sense. It is possible, however, for these faces to be inclined in the opposite end and for the connection piece to be bonded directly to the spar cap 14 of an adjacent segment. However, more particularly, the joint also incorporates the double scarf joint which is the subject of WO 2012/004571. This takes the form of a double scarf component 30 as shown in FIGS. 1, 3 and 4. This has a wide V-shaped cross-section with a first inclined surface 31 configured to match the first inclined end 24 of the spar cap connection piece 20. The double scarf component 30 has a second inclined surface 32 which matches the inclined end face of the spar cap 14 in the second spar cap section 11.

As shown in the drawings, the double scarf component 30 is a single pre-cured component which can be bonded onto the surfaces 24, 33. Alternatively, it may be built up in situ on these inclined surfaces.

The finished joint is shown in cross-section in FIG. 4.

Figure 5A:
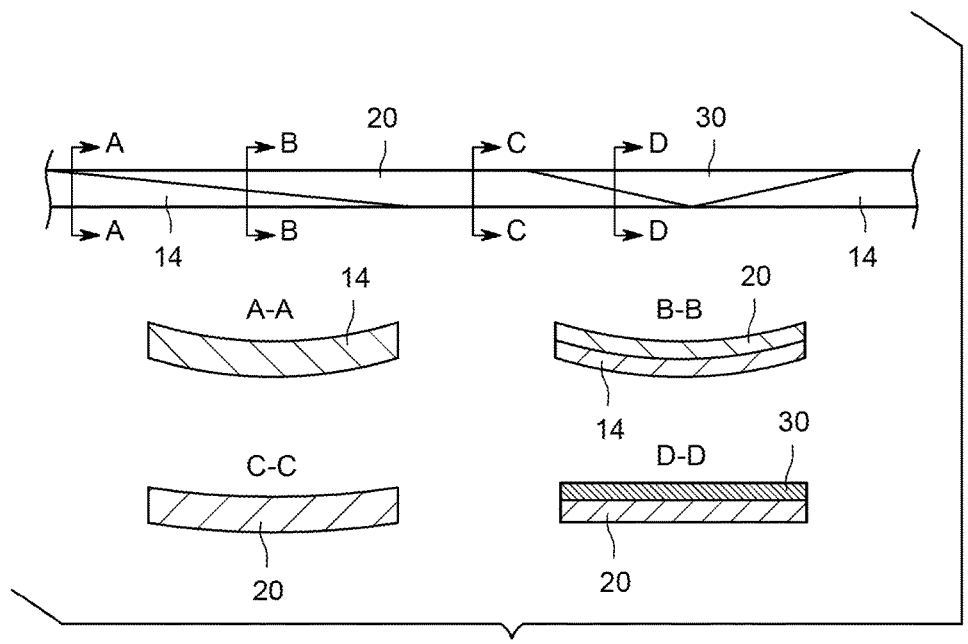
FIG. 5A shows an arrangement similar to FIG. 4 showing the cross-section through a spar cap/connection piece/double scarf component at a number of marked locations along the length of the blade showing a transition from a curved spar cap to a flat spar cap where the transition takes place between the inclined end of the connection piece.
Figure 5B:
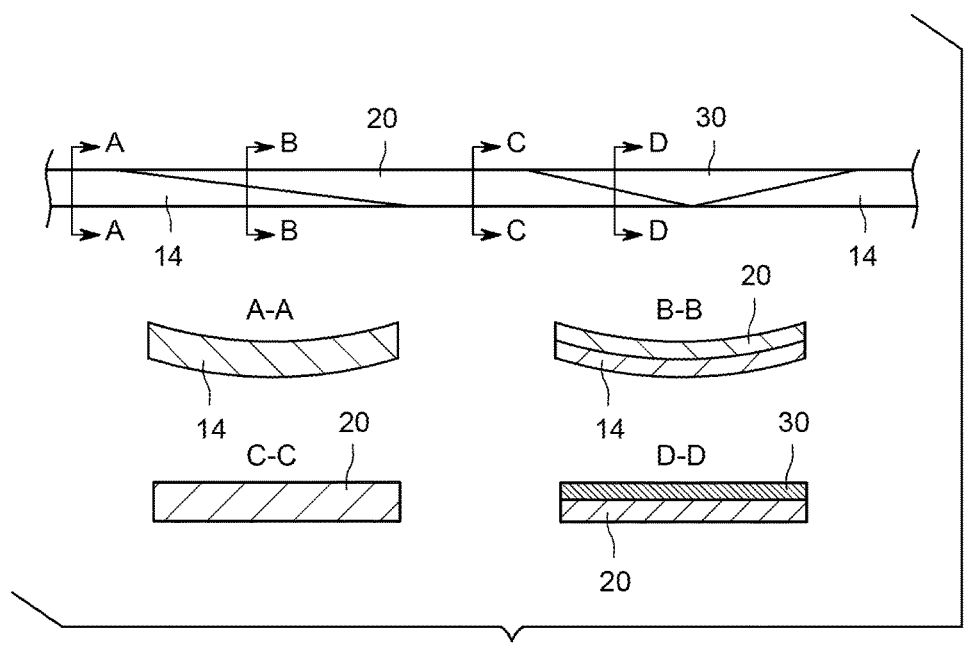
FIG. 5B is a view similar to FIG. 5A in which the transition region extends into the tapered portion of the connection piece.

The transition from the curved spar cap 14 on one component to a flat spar cap 14 in the adjacent component can be achieved in different ways as shown in FIGS. 5A and 5B. In 5a it will be appreciated that in the tapered portion of the connection portion 20 as represented by cross-section B-B, transition to the flatter cross-section has not yet started, by contrast with FIG. 5B in which a significant portion of the transition has already been completed (hence the gentler curve in cross-section). Towards the middle of the non-tapered portion of the connection piece 20 in FIG. 5A (section C-C), about half of the transition has been completed as compared to in FIG. 5b where most of the transition has been completed.

Figure 6A:
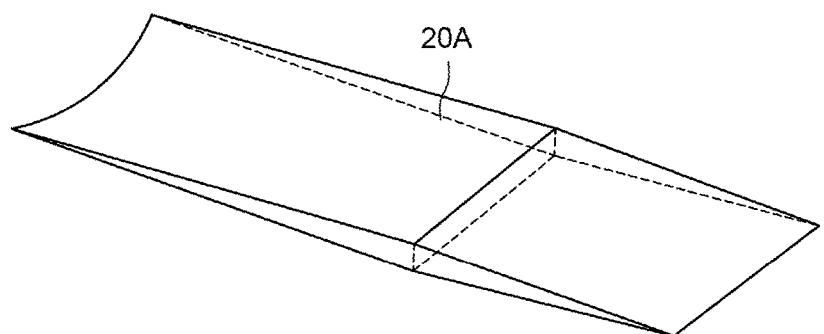
FIGS. 6A, 6B and 6C are perspective views of alternative connection pieces.
Figure 6B:
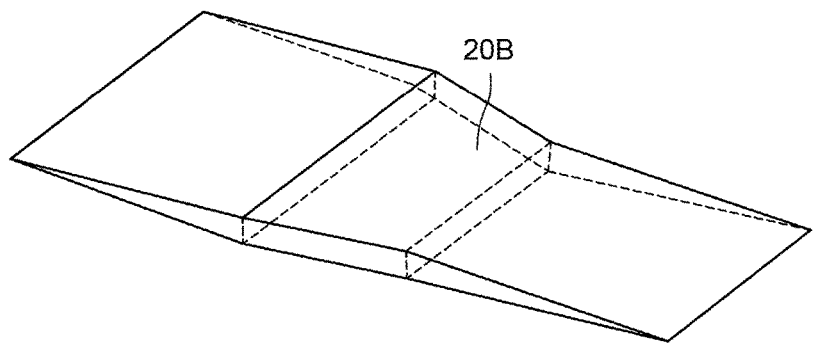
Figure 6C:
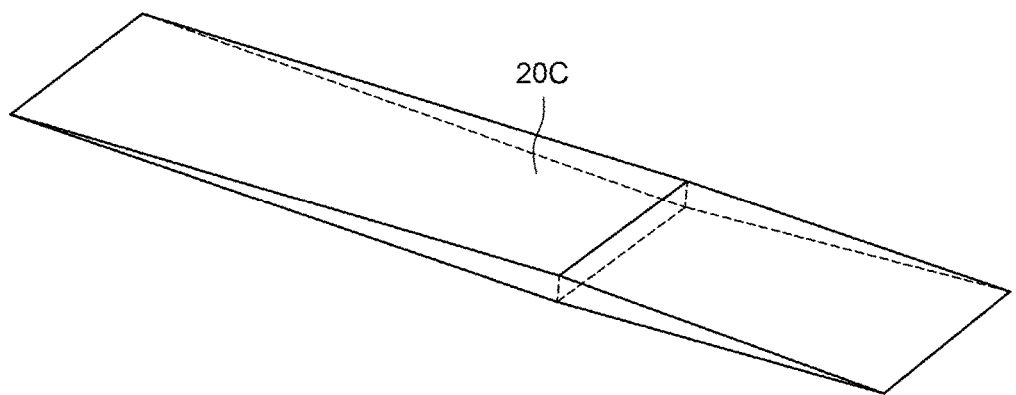

FIGS. 6A to 6C show different configurations of spar cap connection piece.

The connection piece 20A shown in FIG. 6A represents a transition from a curved spar cap at the left hand end to a flat spar cap on the right hand end, but this has only two tapered portions, it does not have the non-tapered central portion of the previous example. In this case, the tapered portions may be correspondingly longer, or the transaction may be more abrupt to accommodate the lack of central portion.

In FIG. 6B, the connection piece 20B represents a transition from a flat spar cap on the left hand side to a narrower spar flat spar cap on the right hand side. A central transition region provides this width reduction. The reduction width may be accompanied by an increase in the thickness to control the cross-sectional are of the spar cap.

FIG. 6C shows a transition between two spar caps of the same shape and size. In common with FIG. 6A, this spar cap has no central untapered portion. It does, however, have a significantly longer tapered portion which may be well suited to making a connection with a third party spar cap of less good or unknown quality.

Figure 7A:
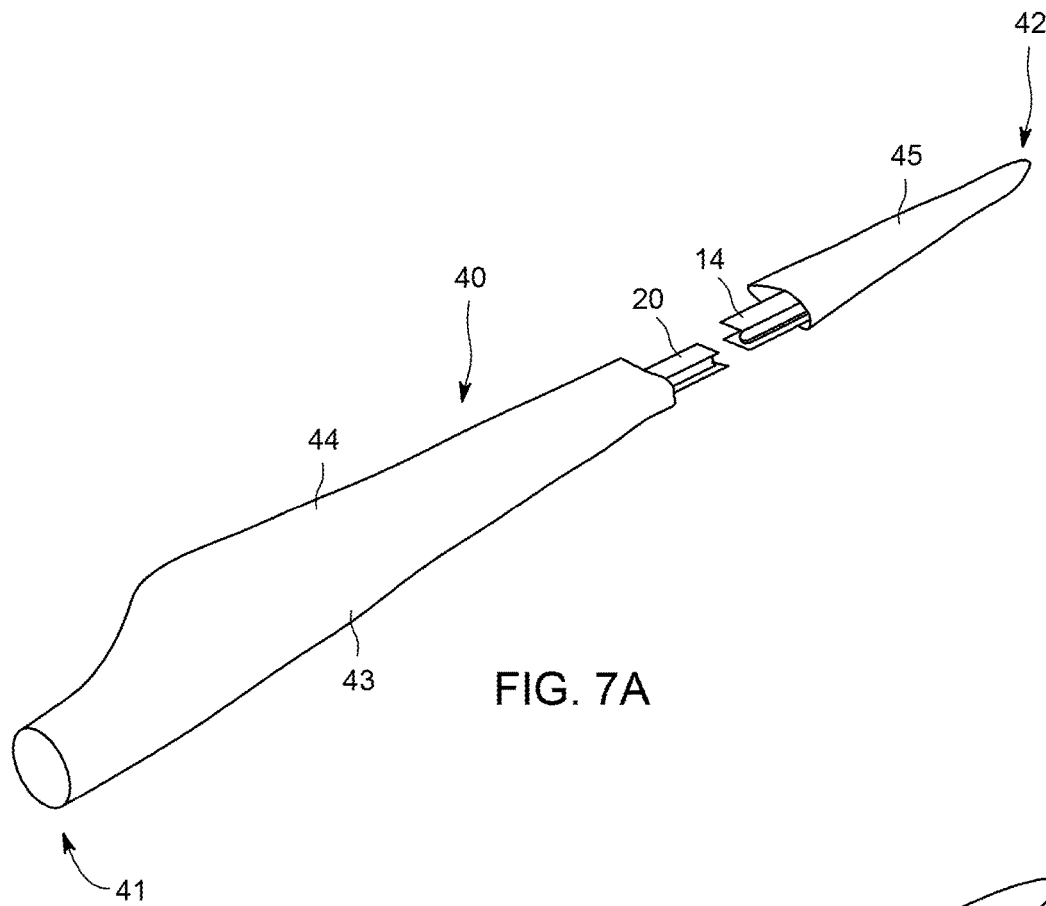
FIGS. 7A and 7B are perspective views showing a full blade before and after assembly.
Figure 7B:
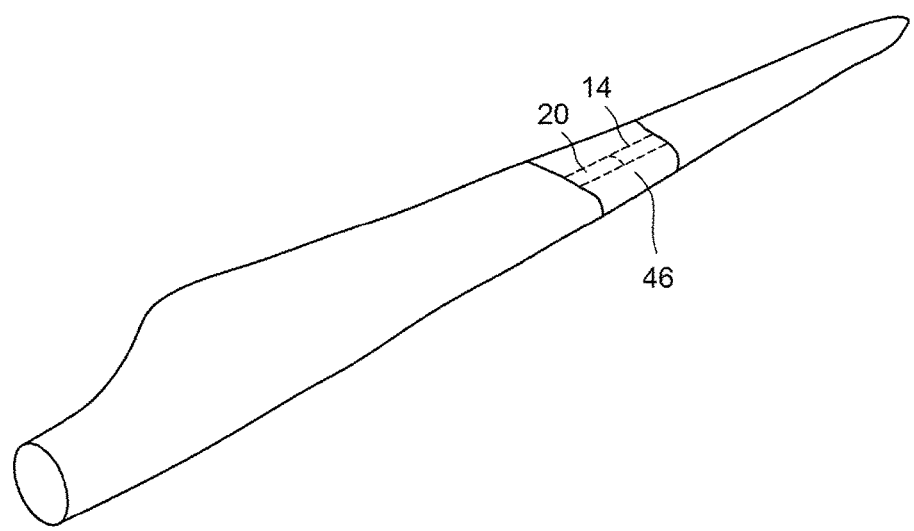

FIGS. 7A and 7B show how the joint is accommodated into a blade 40 which has a hub end 41 and a tip end 42. The blade is formed of a main body 43 which extends along most of the length of the blade. As can be shown, the connection piece 20 extends from an aerodynamic fairing 44 of the root end while a spar cap 14 extends from a tip component 45. The two are brought together and connected as described with reference to the above drawings and a fairing bridging portion 46 covers the joint in this region.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A wind turbine blade comprising:
   a first adjacent blade section and a second adjacent blade section arranged end to end along the length of the blade, each adjacent blade section comprising an aerodynamic fairing and a spar extending along the length of the section; each spar comprising a shear web extending across the fairing and a pair of spar caps, one at either end of the shear web; and
   wherein each spar cap in the first section has a different cross-sectional shape and/or material from the respective spar cap in the second section and wherein the each spar cap in the first section is joined to the respective spar cap in the second section via a connection piece; each connection piece being a pre-cured component extending along the length of the blade from a first inclined end configured to connect to a first complimentary inclined end of the each spar cap in the first blade section and a second inclined end configured to connect to a second complimentary inclined end of the respective spar cap the second blade section;
   wherein the cross-sectional shape and/or material varies along the length of the connection piece so as to be compatible at either end with the adjacent spar cap.

2. The wind turbine blade according to claim 1, wherein the first inclined end of the connection piece is longer than the second inclined end of the connecting piece.

3. The wind turbine blade according to claim 1, wherein the connection piece is made of fibrous layers of uniaxial fibre extending along the length of the blade.

4. The wind turbine blade according to claim 1, wherein there is a double scarf component between the connection piece and the spar cap of the adjacent section.

5. The wind turbine blade according to claim 4, wherein the double scarf component is connected to the second inclined end of the connection piece and an inclined end face of the adjacent spar cap which is oriented in the opposite sense from the second inclined end of the connection piece.

6. The wind turbine blade according to claim 1, wherein the spar caps of one section have a curved profile in cross-section and the spar caps of the adjacent section have a flat profile in cross-section.

7. A method of forming a wind turbine blade according to claim 1, the method comprising attaching a connection piece to each of the spar caps in the first section; and subsequently attaching the connection pieces to a respective spar cap of the second section.

8. The method according to claim 7, wherein the connection piece and respective spar cap in the second section present outwardly facing inclined surfaces inclined in opposite directions and a double scarf component is attached to these surfaces to complete the joint.

9. The wind turbine blade according to claim 2, wherein the connection piece is made of fibrous layers of uniaxial fibre extending along the length of the blade.

10. The wind turbine blade according to claim 2, wherein there is a double scarf component between the connection piece and the spar cap of the adjacent section.

11. The wind turbine blade according to claim 3, wherein there is a double scarf component between the connection piece and the spar cap of the adjacent section.

12. The method of forming a wind turbine blade according to claim 2, the method comprising attaching a connection piece to each of the spar caps in the first section; and subsequently attaching the connection pieces to a respective spar cap of the second section.

13. The method of forming a wind turbine blade according to claim 3, the method comprising attaching a connection piece to each of the spar caps in the first section; and subsequently attaching the connection pieces to a respective spar cap of the second section.

14. The method of forming a wind turbine blade according to claim 4, the method comprising attaching a connection piece to each of the spar caps in the first section; and subsequently attaching the connection pieces to a respective spar cap of the second section.

15. The method of forming a wind turbine blade according to claim 5, the method comprising attaching a connection piece to each of the spar caps in the first section; and subsequently attaching the connection pieces to a respective spar cap of the second section.

16. The method of forming a wind turbine blade according to claim 6, the method comprising attaching a connection piece to each of the spar caps in the first section; and subsequently attaching the connection pieces to a respective spar cap of the second section.

17. A spar cap connection piece comprising a pre-cured composite component comprising uniaxial fibre running along the length of the component from a first end to a second end in a longitudinal direction corresponding, in use, to the longitudinal direction of a spar to which it is fixed, the first and second ends being inclined in the same sense to the longitudinal direction each at a respective acute angle; the spar cap connection piece having a transition region in which the cross-sectional shape of the spar cap connection piece transitions from one form to another along the transition region so that, in use, it is able to connect two spar caps having a different cross-sectional shape.

18. The spar cap connection piece according to claim 17, wherein each inclined end is angled at a different acute angle.

19. The spar cap connection piece according to claim 17, wherein the connection piece transitions from a curved profile in cross-section at one end to a flat profile in cross-section at the opposite end.

20. The spar cap connection piece according to claim 18, wherein the connection piece transitions from a curved profile in cross-section at one end to a flat profile in cross-section at the opposite end.

* * * * *